Nov. 18, 1941. J. R. BRANSFORD ET AL 2,262,791
ELECTRICAL CONDENSER AND METHOD OF MAKING IT
Filed Jan. 19, 1939 3 Sheets-Sheet 1

INVENTORS: J. R. BRANSFORD
A. T. CHAPMAN
BY
E. R. Nowlan
ATTORNEY

Nov. 18, 1941.    J. R. BRANSFORD ET AL    2,262,791
ELECTRICAL CONDENSER AND METHOD OF MAKING IT
Filed Jan. 19, 1939    3 Sheets-Sheet 2
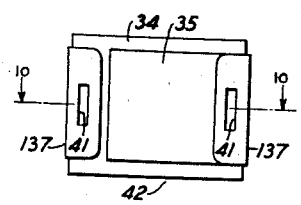
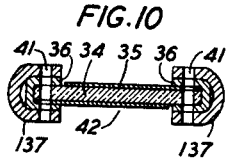
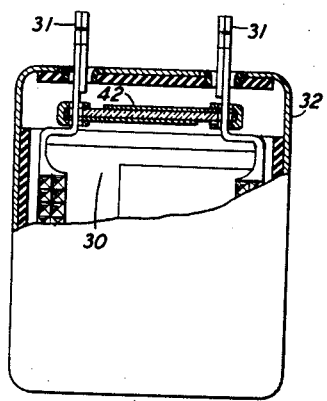
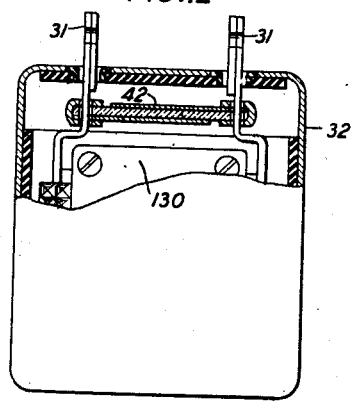
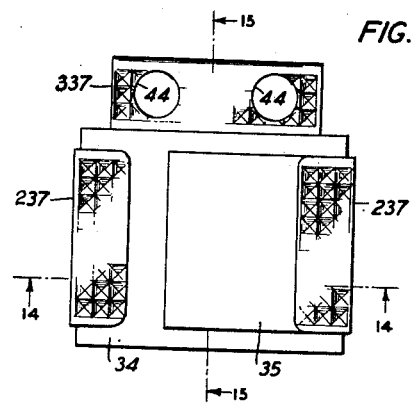
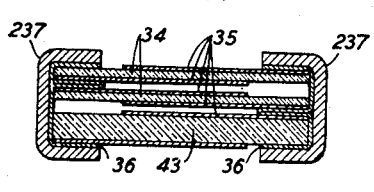
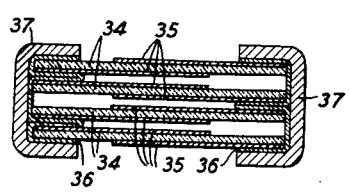
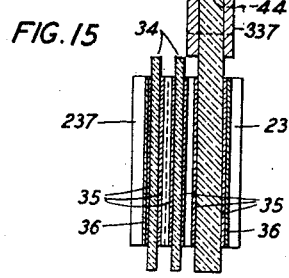
INVENTORS   J. R. BRANSFORD
            A. T. CHAPMAN
BY
E. R. Nowlan
ATTORNEY

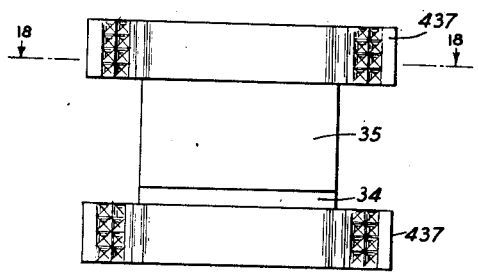
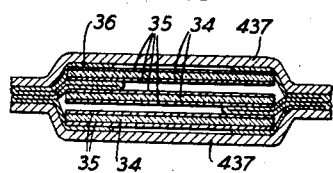
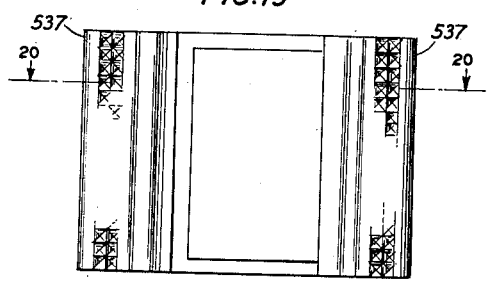
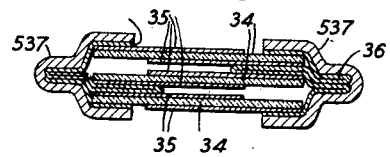
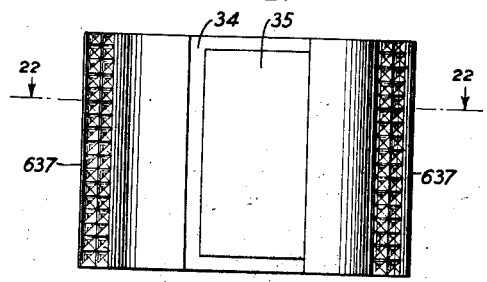
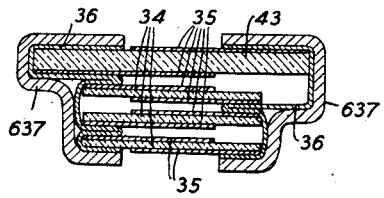
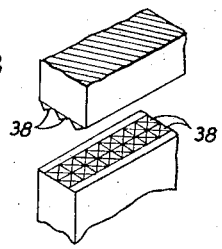

Patented Nov. 18, 1941

2,262,791

UNITED STATES PATENT OFFICE 2,262,791

ELECTRICAL CONDENSER AND METHOD OF MAKING IT

Joseph R. Bransford, Newark, and Alan T. Chapman, Lyndhurst, N. J., assignors to Western Electric Company, Incorporated, New York, N. Y., a corporation of New York Application January 19, 1939, Serial No. 251,698

8 Claims. (Cl. 175—41)

This invention relates to electrical condensers and a method of making them, and more particularly to electrical condensers comprising laminae of dielectric material such as mica having films of metal deposited or formed thereon and to a method of making such condensers.

Condensers in which the electrically important part is a lamina or a stack of laminae of dielectric material such as mica provided with adherent films of metal, usually silver, are of use in innumerable ways in the electrical arts. Important features, among others, in the structure and manufacture of such condensers are to have the metallic film closely adherent to the mica surface to the exclusion of any interposed air or other fluid both for mechanical and electrical reasons, to provide means to protect the metal filmed laminae from atmospheric changes in use, and to provide durable means for making reliable electrical contact with the metal films.

An object of the present invention is to provide an electrical condenser having metal filmed dielectric lamina on which metal films are closely and securely adherent to the surface of the lamina, and having electrical terminal members closely and reliably secured in electrical contact with the metal films.

Another object of the invention is to provide a simple and effective method of making such electrical condensers.

With the above and other objects in view, the invention may be embodied in an electrical condenser comprising one or more laminae of mica, metal films closely adherent to the faces of the mica laminae, continuous strips of metal foil folded into flat loops entering between adjacent laminae to make electrical contact with metal film on the laminae and folded over the edges of the laminae, and metallic terminal members embracing the folded foils and the lamina edges and clinched thereon, there being also optionally a coat or casing of insulating material over the whole.

Another embodiment of the invention may be in a method of making such a condenser, the method comprising steps of selecting mica laminae of uniform dielectric character, depositing a paste of metalliferous material and flux material thereon, baking the paste bearing laminae to form the paste into a continuous film of metal closely adherent to the laminae, stacking the metal filmed laminae while intercalating flat loops of a metal foil strip, running generally along one face of the stack, between the edge portions of adjacent laminae to make electrical contact with the metal films on the laminae, positioning a metal terminal member of C-shaped cross-section over each of two sides of the stack to embrace within each such member one of the metal foil strips and the intercalated edges of the laminae, and crushing the C-shaped members to permanently grip the parts embraced thereby and to establish permanent good electrical contact between the metal films and the metal foil strips and the terminal members and to bind the stack permanently together.

Other objects and features of the invention will clearly appear from the following detailed description of embodiments thereof taken in connection with the accompanying drawings in which the same reference numerals are applied to identical parts in the several figures and in which—

Fig. 9 is a side elevation of a one-lamina condenser;

Fig. 10 is a section on the line 10—10 of Fig. 9;

Fig. 11 is a view similar to Fig. 1 showing the condenser of Fig. 9 applied as a trimmer on the condenser of Fig. 1;

Fig. 12 is a view similar to Fig. 11 showing the condenser of Fig. 9 applied as a trimmer on another type of condenser;

Fig. 13 is a view similar to Fig. 2 showing a condenser having a mounting member independent of the clamping members;

Fig. 14 is a section on the line 14—14 of Fig. 13;

Fig. 15 is a section on the line 15—15 of Figs. 13 and 14;

Fig. 16 is a view similar to Fig. 3 but showing more laminae;

Fig. 17 is a view similar to Fig. 2 of another form;

Fig. 18 is a section on the line 18—18 of Fig. 17;

Fig. 19 is a view similar to Fig. 17 of a different modification;

Fig. 20 is a section on the line 20—20 of Fig. 19;

Fig. 21 is a view similar to Fig. 19 of yet another form;

Fig. 22 is a section on the line 22—22 of Fig. 21; and

Fig. 23 is a perspective of the working ends of a tool as used in clinching the clamping members.

Figure 1:
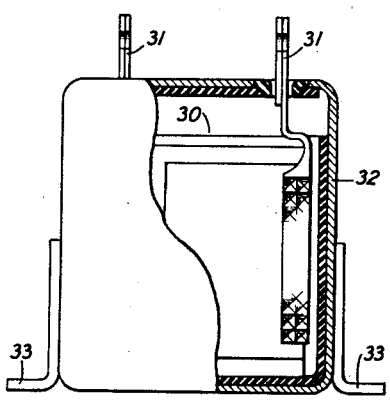
Fig. 1 is a view in elevation and partly broken away of a completed and potted condenser constructed in accordance with the invention.
Figure 4:
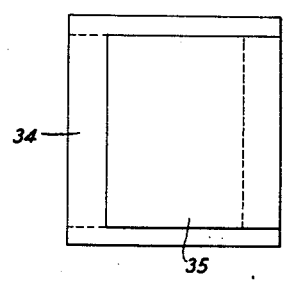
Fig. 4 is a face view of one lamina.
Figure 5:
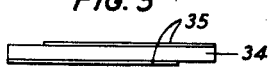
Fig. 5 is an edge view thereof.

Fig. 1 discloses a condenser proper generally indicated at 30 and having permanently attached terminals 31 housed in a "can," "pot" or container 32, which latter is provided with attached mounting or supporting members 33. The space inside the can 32 and not occupied by the condenser proper is usually filled with some waterproof "potting compound," e. g. asphalt or a wax mixture. The condenser proper 30, before being "potted" in the can is shown in side elevation in Fig. 2 and in section in Fig. 3. It comprises primarily one or more metal filmed laminae of mica or other suitable dielectric material, such as is shown in face in Fig. 4 and in section in Fig. 5. This is a thin sheet or lamina 34 of substantially uniform thickness, with a film or coating 35 of metal, usually silver, on each side. In the preferred construction shown in Figs. 4 and 5 the metal film on each side extends over the face of the lamina to one edge only, leaving a strip of bare mica between the other three edges of the mica and the corresponding edges of the coating; and the edge on one face where the metal comes clear out to edge of the lamina is on the opposite side of the lamina from the corresponding edge on the other face, as clearly shown in Fig. 5.

Condensers such as those here in question, are often built to have a certain prescribed electrostatic capacity. One important factor in arriving at a condenser of the desired capacity is the thickness of the mica laminae. Hence a preliminary step in a preferred method of making condensers under the present invention, is the selection of the requisite number of mica sheets of suitable size and all of substantially one and the same prescribed thickness.

Such selected laminae are then provided, over the areas where the metal films are to be, with a coating of a suitable metalliferous paint or paste or the like, comprising a finely divided elemental metal or suitable compound of a metal together with a suitable fluxing material, a vehicle and, if necessary, volatile solvent or drier or other accessory ingredient. One composition suitable for this purpose may contain dispersed metallic silver or silver oxide or one or another easily decomposable salt of silver such as silver acetate or a mixture of these, together with a fluxing substance, e. g. kauri gum and cadmium borate, in a slight amount of an oil vehicle or of a pyroxylin in amyl alcohol vehicle, or the like. Such a paste is in the commercial market at present, readily prepared, manufactured by a Du Pont company, and known as V-11 Du Pont silver paste. The paste may be applied by hand with a brush or by rolling, stamping, printing, spraying, or in any suitable manner. Ordinarily one coating, with the Du Pont paste at least, is sufficient. However, with some pastes or where a film of unusually high conductivity is desired, more than one coating may be applied. The coated laminae are then air dried if necessary, though in some cases they may go directly from the pasting to be baked.

The pasted laminae are then baked, preferably at a temperature rising to from 900°–1200° F. This baking reduces any combined silver in the paste to metal and deposits all the silver on the face of the mica as a closely adherent and continuous film of substantially pure metal adhered to the mica by the product of the partly decomposed flux, while the vehicle, solvent if any, etc. are driven off, decomposed or burned away.

Figure 3:
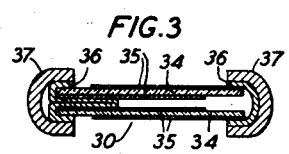
Fig. 3 is a section on the line 3—3 of Fig. 2.

The baked laminae may then be assembled into a stack, as best shown in the middle portion of Fig. 3, with one or more strips 36 of metal foil. This foil may be lead or tin or copper or aluminum or, in short, of any metal or alloy soft and pliable enough for the purpose although tinned copper may be preferred in some instances. The right hand strip 36, in Fig. 3, is simply folded once to lap over and electrically connect the top film 35 with the bottom film 35; while the left hand strip 36 curls around the left edge of the upper of the two mica sheets 34, is folded in a flat loop between and electrically connecting the two inner films 35, and is curled around the edge of the lower mica sheet 34.

Thus, as shown, the left hand strip 36 is in electrical connection with both inner metal films 35 but does not make contact with either of the outer films 35; while the right hand strip 36 is connected electrically to both outer metal films 35 but is not in contact with either inner film 35.

A thin sheet metal terminal and clamping member having a body 37 and an integral terminal member 31, and whose body has a substantially C-shaped cross-section preformed to embrace the stacked laminae and strips at an edge of the stack, as shown, is then positioned over each of two opposite edges or sides of the stack, as shown in Fig. 3.

Figure 2:
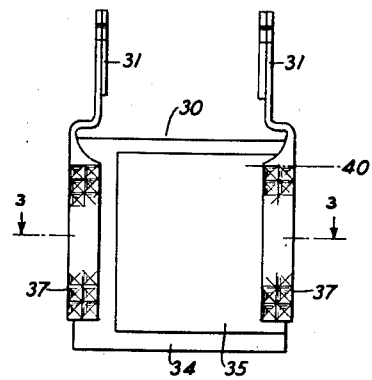
Fig. 2 is a view in elevation of the condenser proper removed from its container.

Some squeezing tool, pliers, press, stamp, hammer or the like, preferably with a working face such as illustrated at 38 in Fig. 23, is applied to the body 37 to compress this and its contents, and to lock the compressed parts together, thus making the permanent assembly disclosed in Figs. 2 and 3.

It is to be particularly noted that, especially in the sectional figures, the thickness dimensions of the mica 34, the metal films 35, the strips 36 and the clamp bodies 37 have been strongly exaggerated relatively to the other dimensions in the figures. A typical structure such as shown in Fig. 2 might have a width and height of the order of 1½ to 2 inches, while in Fig. 3 the true thickness of the mica laminae 34 would be of the order of 0.0010 to 0.0015 inch, that of the foil 36 of the order of 0.0005 to 0.0010 inch, and the thickness of the clamp body 37 is of the order of 0.015 inch, while the thickness of the metal films 35 may range from a relatively few molecules to something measured in one or two thousandths perhaps.

It would appear from Fig. 3, as drawn, that crushing down the C at the right should produce a considerably thinner result than at the left, because of the apparently wide space between the right hand portion of the mica sheets 34. However, in reality this space will be of the order of only 0.001 to 0.002 inch, and the difference is in fact negligible.

The foregoing steps in the procedure produce substantially the product shown in Fig. 2. This is then baked at about 300° F. for thirty to sixty minutes, cooled and tested for capacity. Ordinarily the parts are so selected and dimensioned that this product should have, and usually does have, a capacity not in defect but permissibly slightly in excess of the desired prescribed value. Any excess may then be corrected by scraping away a suitable fraction of one or the other or both of the outside films 34.

The adjusted condenser may then be baked again at about 300° F. for thirty to sixty minutes to drive out residual moisture, if any, and finally soaked in some sealing material, such as a high melting point mineral wax or the like, for a long enough period, e. g. thirty to sixty minutes, to impregnate and seal it permanently against atmospheric effects.

This is then a finished product, ready for use in many instances, or is then potted in a can in the manner shown in Fig. 1.

Where the ultimate possible accuracy is desired, the step of adjusting the capacity by scraping away a portion of the film is deferred until after the step of soaking the mechanically complete condenser in hot wax, as this last procedure may alter the capacity value slightly. The adjustment is then made by scraping away a fraction of the film as before, together with the overlying wax coating. The finally adjusting condenser may then be momentarily dipped into the molten wax to recover the scraped spot.

Figure 6:
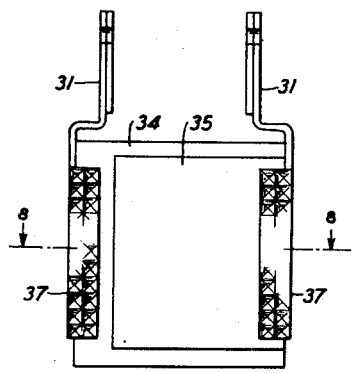
Fig. 6 is a side elevation of a compound condenser.
Figure 7:
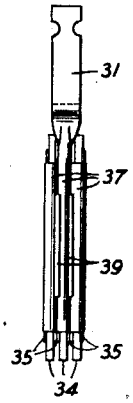
Fig. 7 is a front elevation thereof.
Figure 8:
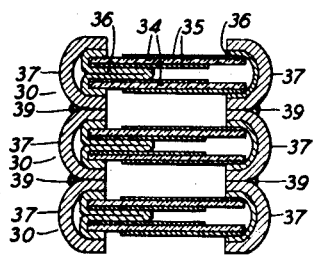
Fig. 8 is a section on the line 8—8 of Fig. 6.

If a larger capacity is desired, it may be achieved, beside by building condensers of greater height and widths, by combining several such units as shown in Fig. 2, in the manner illustrated in Figs. 6, 7 and 8. Here three of the structures shown in Fig. 2, before being treated with wax, have been brought together and joined by soldering their juxtaposed clamping members together as indicated at 39. Thus the three clamps 37 on the left (Fig. 8) become electrically one body and likewise the three clamps 37 on the right. The terminals 31 of the two outside units are preferably cut away at the level indicated at 40 in Fig. 2, leaving the terminals 31 of the middle unit to serve for the whole, as shown in Fig. 7.

Another way to achieve increased capacity is to increase the number of metal filmed mica laminae stacked together in one pair of clamps. Fig. 16 illustrates in cross-section a structure like that shown in Fig. 2, but having twice as many laminae. Twenty and more metal filmed mica laminae have been successfully stacked in this manner into one satisfactory structure.

Ordinarily a manufacturer may be expected to produce for commercial use a plurality of sizes of such units as illustrated in Figs. 3, 8 and 16. Need may arise for such a condenser having a capacity a little above one of the standard sizes and too far below the next larger size to permit of reducing the next larger by scraping away part of its outer films. In such a case a small supplemental or "trimmer" condenser may be bridged across the terminals of a larger one, as shown in Fig. 11. Such a trimmer condenser may be satisfactorily made in the above described manner but containing only one mica lamina 34 with its two metal films 35 and with foil strips 36 and clamp bodies 137 as before. However, the clamp bodies 137 here have no projecting terminals 31. Instead there are slots 41 formed through the finished structure, as shown, by means of which, as disclosed in Fig. 11, the trimmer condenser generally indicated at 42 may be mounted on the terminals 31 of the main condenser generally indicated at 30. If desired the two together may be potted as before in a can 32. Use of a trimmer condenser of this construction is not confined to main condensers of like construction. Fig. 12 shows such a trimmer 42 similarly mounted on a main condenser 130 of other construction. This construction is not limited to a single mica lamina and pair of metal films as disclosed. Two or more such may be included if desired and apertured at 41.

If a condenser of the general construction disclosed is to be used in some manner such that it is not satisfactory to use the electrical terminals as mechanical supports also, a construction as disclosed in Figs. 13 and 14 may be employed. So far as the electrical body of the condenser is concerned this is practically the same as the structure of Figs. 3 and 10. However the clamp bodies 237 are here unprovided with either terminals 31 or apertures 41, although either may be provided if desired. As disclosed, it is assumed that lead wires are to be secured directly to the clamp bodies in some suitable manner, e. g. soldered thereto or clamped therein as disclosed in copending application Serial No. 251,745, filed of even date herewith by one of the present inventors which has matured into Patent Number 2,224,288. For mechanical support there is included in the condenser stack an additional lamina 43 of mica large enough to extend outwardly from the stack and which may or may not be provided with metal films. The protruding portion of this lamina 43 may preferably be stiffened by crushing a sheet metal clamp 337 thereover. It may also be provided with apertures 44 to receive rivets, screws or the like for mechanically mounting the condensers. While generally the lamina 43 will be filmless and so electrically inert and functionless, the part of this lamina within the stack may be provided with metal films if desired as shown in Figs. 14, 15, and 16.

There may be instances where it is undesirable to have any appreciable clamping pressure on the stack itself and yet to hold its components lightly together in proper electrical relation. Figs. 17 and 18 show one modification to effect this result. In this structure the clamping members 437 extend at each end beyond the perimeter of the stack and only these projecting portions are crushed together in the tools of Fig. 23. In Figs. 19 and 20, the clamping members 537 are wider than in the preceding instances, and fit over the stack only half their width, the outer half being crushed down on the strips 36 only. Figs. 21 and 22 show a structure similar to the last one, except that a stiffening lamina 43 is included in the stack and is wider than the rest of stack, thus extending into and being gripped by the crushed portions of the clamping members 637, together with the strips 36.

Other variations in the structural embodiments of the invention and in the methods of assembling them will readily suggest themselves from the above illustrative examples, as the invention is not limited to these specific disclosures but only by the appended claims.

What is claimed is:

1. An electrical condenser comprising a stack of laminae of dielectric material, films of metal on the adjacent faces of two of the laminae, a strip of relatively soft metal passing over one of the faces of the stack formed by the superimposed edges of the lamina and the strip being formed with a folded flat loop therein positioned between the two film bearing faces of the two said laminae and in electrical contact with the two said films, and a clamping member of relatively hard metal embracing and crushed down upon the strip and the face of the stack against which the strip lies and serving by its own spring tension only to clamp the laminae together and to enforce contact between the said films and the strip and to effect contact of the clamping member with the strip.

2. An electrical condenser comprising a stack of laminae of dielectric material, films of metal on the adjacent faces of two of the laminae, a strip of relatively soft metal passing over one of the faces of the stack formed by the superimposed edges of the lamina and the strip being formed with a folded flat loop therein positioned between the two film bearing faces of the two said laminae and in electrical contact with the two said films, a third metal film on a third lamina of the stack, the said strip being also folded to make contact with the third film, and a clamping member of relatively hard metal embracing and crushed down upon the strip and the face of the stack against which the strip lies and serving by its own spring tension only to clamp the laminae together and to enforce contact between the said films and the strip and to effect contact of the clamping member with the strip.

3. An electrical condenser comprising a stack of laminae of dielectric material, films of metal on the adjacent faces of two of the laminae, a strip of relatively soft metal passing over one of the faces of the stack formed by the superimposed edges of the lamina and the strip being formed with a folded flat loop therein positioned between the two film bearing faces of the two said laminae and in electrical contact with the two said films, and a clamping member of relatively hard metal embracing and crushed down upon the strip and the face of the stack against which the strip lies and serving by its own spring tension only to clamp the laminae together and to enforce contact between the said films and the strip and to effect contact of the clamping member with the strip, the clamping member being further formed with an integral projecting portion to serve both as an electrical terminal and as a mechanical support for the condenser.

4. An electrical condenser comprising a stack of laminae of dielectric material, films of metal on the adjacent faces of two of the laminae, a strip of relatively soft metal passing over one of the faces of the stack formed by the superimposed edges of the lamina and the strip being formed with a folded flat loop therein positioned between the two film bearing faces of the two said laminae and in electrical contact with the two said films, a third metal film on a third lamina of the stack, the said strip being also folded to make contact with the third film, and a clamping member of relatively hard metal embracing and crushed down upon the strip and the face of the stack against which the strip lies and serving by its own spring tension only to clamp the laminae together and to enforce contact between the said films and the strip and to effect contact of the clamping member with the strip, the clamping member being further formed with an integral projecting portion to serve both as an electrical terminal and as a mechanical support for the condenser.

5. An electrical condenser comprising a stack of laminae of dielectric material, films of metal in pairs on adjacent faces of several pairs of the laminae, a strip of relatively soft metal positioned upon one of the faces of the stack formed by the superimposed edges of the laminae and formed with a folded flat loop therein positioned between and in contact with the two members of each pair of films of metal to electrically connect all of the said films, and a C-shaped clamping member of relatively hard metal embracing the said face of the stack and the said strip of relatively soft metal and in contact with the strip and serving by its own spring tension only to clamp the laminae together and to enforce electrical contact of the films with the strip, and of the strip with the clamping member.

6. An electrical condenser comprising a stack of laminae of dielectric material, films of metal in pairs on adjacent faces of several pairs of the laminae, a strip of relatively soft metal positioned upon one of the faces of the stack formed by the superimposed edges of the laminae and formed with a folded flat loop therein positioned between and in contact with the two members of each pair of films of metal to electrically connect all of the said films, and a C-shaped clamping member of relatively hard metal embracing the said face of the stack and the said strip of relatively soft metal and in contact with the strip and serving by its own spring tension only to clamp the laminae together and to enforce electrical contact of the films with the strip and of the strip with the clamping member, the clamping member being further formed with an integral projecting portion to serve both as an electrical terminal and as a mechanical support for the condenser.

7. An electrical condenser comprising a stack of mica laminae, films of silver in pairs on adjacent faces of several pairs of the laminae, a strip of tinned copper positioned upon one of the faces of the stack formed by the superimposed edges of the laminae and formed with a folded flat loop therein positioned between and in contact with the two members of each pair of silver films to electrically connect all of the said films, and a C-shaped clamping member of relatively hard metal embracing the said face of the stack and the said strip of tinned copper and in contact with the strip and serving by its own spring tension only to clamp the laminae together and to enforce electrical contact of the films with the strip and of the strip with the clamping member.

8. An electrical condenser comprising a stack of mica laminae, films of silver in pairs on adjacent faces of several pairs of the laminae, a strip of tinned copper positioned upon one of the faces of the stack formed by the superimposed edges of the laminae and formed with a folded flat loop therein positioned between and in contact with the two members of each pair of silver films to electrically connect all of the said films, and a C-shaped clamping member of relatively hard metal embracing the said face of the stack and the said strip of tinned copper and in contact with the strip and serving by its own spring tension only to clamp the laminae together and to enforce electrical contact of the films with the strip and of the strip with the clamping member, the clamping member being further formed with an integral projecting portion to serve both as an electrical terminal and as a mechanical support for the condenser.

JOSEPH R. BRANSFORD.
ALAN T. CHAPMAN.